US008769655B2

(12) United States Patent
Gould et al.

(10) Patent No.: US 8,769,655 B2
(45) Date of Patent: Jul. 1, 2014

(54) SHARED REGISTRATION MULTI-FACTOR AUTHENTICATION TOKENS

(75) Inventors: James Gould, Leesburg, VA (US); David Smith, Arlington, VA (US); Mingliang Pei, Palo Alto, CA (US)

(73) Assignee: Verisign, Inc., Reston, VA (US)

( * ) Notice: Subject to any disclaimer, the term of this patent is extended or adjusted under 35 U.S.C. 154(b) by 424 days.

(21) Appl. No.: 12/982,800

(22) Filed: Dec. 30, 2010

(65) Prior Publication Data

US 2012/0174198 A1    Jul. 5, 2012

(51) Int. Cl.
*H04L 9/32* (2006.01)
*H04L 29/06* (2006.01)

(52) U.S. Cl.
CPC ......... *H04L 63/0807* (2013.01); *H04L 63/0815* (2013.01)
USPC .......... 726/9; 726/6; 726/8; 709/223

(58) Field of Classification Search
CPC ......... G06F 21/30; G06F 21/33; G06F 21/41; H04L 63/0807; H04L 63/0815
USPC ........................ 726/6, 9, 8; 709/223
See application file for complete search history.

(56) References Cited

U.S. PATENT DOCUMENTS

| 6,629,591 | B1 * | 10/2003 | Griswold et al. | 194/205 |
| 2003/0061512 | A1 * | 3/2003 | Flurry et al. | 713/201 |
| 2004/0054898 | A1 * | 3/2004 | Chao et al. | 713/168 |
| 2006/0021019 | A1 * | 1/2006 | Hinton et al. | 726/10 |
| 2008/0060065 | A1 | 3/2008 | Wynn et al. | |
| 2008/0127321 | A1 * | 5/2008 | Vaeth | 726/9 |
| 2008/0189778 | A1 * | 8/2008 | Rowley | 726/9 |
| 2009/0097661 | A1 * | 4/2009 | Orsini et al. | 380/279 |
| 2010/0228836 | A1 * | 9/2010 | Lehtovirta et al. | 709/220 |
| 2010/0235623 | A1 * | 9/2010 | Simpson et al. | 713/155 |
| 2010/0325723 | A1 | 12/2010 | Essawi et al. | |

FOREIGN PATENT DOCUMENTS

WO    WO 00/65511 A2    11/2000

OTHER PUBLICATIONS

International Search Report and Written Opinion issued in International Patent Application No. PCT/US2011/065781; 11 pages; date of mailing: Apr. 4, 2012.

* cited by examiner

*Primary Examiner* — Jung Kim
*Assistant Examiner* — Ngoc D Nguyen
(74) *Attorney, Agent, or Firm* — MH2 Technology Law Group, LLP

(57) ABSTRACT

A system and method for more efficiently establishing a chain of trust from a registrant to a registry. A registrant credential is associated with a Shared Registration command and is sent by a registrar to a registry. Upon successful validation, a token is generated and bound to a registrant identifier. The token is included along with the registrant identifier in subsequent discrete Shared Registration commands submitted to the registry on behalf of the registrant. The registrant thus needs to submit its credential only once for changes that require several discrete commands. Also, it is more efficient for the Shared Registration System to validate a token for a set of commands than to validate different registrant credential for each discrete command.

17 Claims, No Drawings

SHARED REGISTRATION MULTI-FACTOR AUTHENTICATION TOKENS

BACKGROUND OF THE INVENTION

A domain name registration system in which registry services are shared among multiple independent registrars is a Shared Registration System (SRS.) The SRS presently implemented on the Internet utilizes the Extensible Provisioning Protocol (EPP), a text/XML protocol that permits multiple service providers (such as registrars) to perform object provisioning operations using a shared central object, such as a registry. EPP includes extension mechanisms that provide for the modification and/or addition of implementation-specific features and other object management capabilities.

Security is needed for a SRS to protect the integrity of domain name registrations. For example, security measures are implemented to ensure that only accredited registrars can add, delete or otherwise modify a domain name record at a registry. Such security measures can include requirements that the registry authenticate a registrar before the registry processes EPP commands. The registry can authenticate the registrar by verifying the registrar's digital certificate, requiring and verifying a registrar password, verifying that the registrar's communications originate from an IP address (or address range) known to be associated with the registrar, etc.

Security measures can also be implemented for communications between a registrant and the registrar. This is important to ensure that modifications requested for a domain name properly originate with an authorized party, such as the registrant itself. Such security measures can include requiring and verifying a registrant password at the registrar, verifying the registrant's digital certificate, etc.

Domain names are assigned, released, and managed using the Extensible Provisioning Protocol (EPP). The EPP is a flexible protocol designed for allocating objects within registries over the Internet. Other objects currently provisioned using EPP are host names and contact information. The motivation for the creation of EPP was to provide a flexible communication protocol between registrars and registries and registrars. Although EPP is widely adopted by many registries, the term "provisioning objects," as that term is used herein, should be understood to include any logical entity that can be or is registered. Such registrable objects may be able to be created, deleted and modified. Such provisioning objects are described in the standards that define EPP, Examples of standard provisioning objects include domain names in RFC 5731, host names in RFC 5732, and contacts in RFC 5733 information, as well as any resource that may be provisioned by a first entity to a second entity where the first entity has ultimate control over the resource. It should also be understood that, as used herein, provisioning objects also include the yet-to-be-developed structures that may replace or modify the provisioned objects presently available in EPP. A provisioning object includes the standard EPP objects as existing or yet-to-be-developed objects following the EPP standard.

Another security measure is Auth Info, which includes a secondary password used to authorize domain name transfers. When a registrant wishes to initiate a transfer, the registrant provides its Auth Info password to the gaining registrar, who uses it to initiate the transfer request. The use of the secondary Auth Info password can prevent the unauthorized transfer of a domain name.

Known security measures are not entirely effective against all threats. For example, an unauthorized entity that has stolen the actual registrant's credentials can pose as the registrant and improperly add, delete or modify a domain name record in the registrant's name. Likewise, a registrar (or an entity posing as a registrar that has the registrar's credentials) can improperly add, delete or modify a registrant's domain name record. The standard mechanism for authorization for the Shared Registration System Extensible Provisioning Protocol (EPP) (IETF STD: 69) is the use of an authorization code that acts as a password linked to a domain name. The authorization code is set by the Registrars, where the policy of the format and frequency of change is determined by the Registrar. If the authorization code does not follow password complexity best practices, a domain record may be subject to unauthorized modification. For example, the authorization code may be guessed by an unauthorized party. Thus, such a modification may be accomplished using a transfer request from one registrar to another, followed by the losing registrar failing to ACK the transfer, resulting in the registry doing an "auto-ACK." What was needed was a system that could validate the actual registrant's authorization to make changes to a domain name record.

A known system that verifies the registrant's authorization to make changes to a domain name record creates a chain of trust between a registrant and a registry. This system is described in U.S. patent application Ser. No. 12/487,567, "SHARED REGISTRATION SYSTEM MULTI-FACTOR AUTHENTICATION," filed on Jun. 18, 2009, which is hereby incorporated by reference herein in its entirety. It permits a registrant to generate one or more credentials (e.g., a One Time Password (OTP), a biometric scan of the registrant's fingerprint, iris or retina, a registrant digital certificate on a smart card, etc.) One or more of these credentials is submitted by the registrant to the registrar when the registrant requests changes to its domain name registrations. The registrar sends the credentials in commands it sends to a registry to effectuate these changes. The registry can process the commands only if it can successfully validate the registrant's credentials. However, it can be burdensome for the registrant to submit a new credential for each discrete command to modify a domain name record. It can also be inefficient for the Shared Registration System to validate a different registrant credential for each command. What is needed is a more efficient way to ensure the chain of trust between a registrant and a registry.

SUMMARY OF THE INVENTION

The present invention relates generally to systems for managing domain name records maintained at a registry. More specifically, the present invention relates to more efficient methods and systems for providing a chain of trust from a registrant to a registry using tokens based upon multi-factor authentication. In accordance with an embodiment of the present invention, one or more credentials from the registrant that can be used to authorize and/or authenticate a registrant request to change (add, delete, update, and transfer) a domain name record is bound to a message indicating the change from a registrar to a registry that maintains the record. The factor can be verified before the registry processes the change message from the registrar. If the factor is not verified, the change request embodied in the message can be rejected by the registry. This can prevent an unauthorized entity from having changes improperly implemented to a domain name record. It can also prevent a registrar from changing a domain name record without the authorization of the registrant or another entity authorized to cause such changes.

Rather than requiring a new registrant credential for each discrete Shared Registry command, embodiments of the present invention include authorizing several discrete commands that include a token generated by the registry or a third party authentication service provider and sent to the registrar. By supporting a token generated by an authentication service provider, a registrar can use multi-factor authentication for its login page and interface with multiple registries using the generated token. This would unburden the registrant to use its credential many times because it could require the registrant to only use its credential once instead of once per registry or once per discrete registry command. The token can be bound to an identifier that is associated with a registrant credential that has been successfully validated. The token can include a digital signature and a Time To Live (TTL).

These and other embodiments of the invention are described in more detail in conjunction with the text below and attached figures.

DETAILED DESCRIPTION OF EMBODIMENTS OF THE INVENTION

A user of provisioning objects, such as a domain name registrant, may wish to effectuate changes to a set of such objects that necessitates the issuance of numerous commands, such as EPP commands. As used herein, a command to change some aspect of a provisioning object can be known as a "provisioning object transform command." For example, a registrant may wish to set a status across all of its domains. The sponsor for the provisioning objects, such as a domain name registrar, may store indications showing that the objects (e.g., domains) are protected by requiring multi-factor authentication for any request to make any changes to them. For example, a registrant may have its mobile platform credential identifier or identifiers associated with its account at the registrar. The sponsor can prompt the user to provide one or more credentials and credential identifiers to assist in authentication. For example, the registrar can prompt the registrant to provide a One Time Password ("OTP"), which it can pass (along with the identifier) to the registry with a request to generate an authentication token ("authToken") that can be used to authenticate multiple commands to modify the registrant's provisioning object registrations during the session. The registry can validate the OTP or may pass it to a trusted third party for validation. If the Shared Registration System supports more than one multi-factor authentication service, the registry can identify the responsible validator and pass the credential(s) and identifier(s) to the third party for validation. The responsible service can be determined in any suitable way, e.g., by lookup table based upon the credential identifier, by the range within which the identifier falls, by the format or type of the credential or identifier, etc.

If the credential is determined not to be valid, an error message can be returned. If the validation is successful, the registry or third party authentication service provider can bind the credential identifier to the domain and generate a token that can include the matching credential identifier, a digital signature, a created date, an expiration date and/or other suitable attributes. The registry or third party authentication service provider can pass the generated token to the registrar, which can later pass the token back to the registry bound with each discrete provisioning object command for the registrant. The registry can validate the digital signature and the expiration date of the token and compare the one or more credential identifiers bound to the token with the one of more credential identifiers bound to the domain. If any of the credential identifiers in the domain match that of the token, then the domain update is authorized. Otherwise, an error can be returned.

The expiration date can be a Time To Live (TTL) value. As used herein, a "TTL" includes any mechanism that can be used to determine the expiry of an authToken. The TTL value can be expressed in any suitable way, such as a duration of time (e.g., 360 seconds) after the created date, a number of uses (e.g., for 20 commands), a particular time and date (e.g., 23:45:13 GMT on Oct. 31, 2011), etc. The term "expiration date" as used herein has the same meaning as "TTL."

The registrar can send a new CREATE-AUTH-TOKEN command to the registry with a list of credential identifiers (e.g., one or more identifiers associated with OTP generators, biometric data, etc.) and one or more credentials (one or more actual OTPs, biometric scans, etc.) The one or more credentials can be verified by the registry or be passed to one or more third party validation services. After successfully verifying the credentials, a data object (e.g., authToken) can be created with the one or more matching credential identifiers that match the successfully validated credentials. authToken can also include one or more of a created date, expiration date (e.g., TTL). These attributes can be signed using a private key of the registry. The resulting signature can be included in authToken, which can be returned to the registrar. Subsequent commands from the registrar to the registry can include authToken, e.g., as an extension to EPP commands.

A credential identifier can be bound to the domain by sending an UPDATE domain command including authToken with "bind" as the action type. When this command is received, the signature set in authToken can be validated using the public key. authToken can also be validated to ensure that the TTL has not expired. After these two validations have been successfully completed, the credential identifier can be bound to the domain.

Updating a provisioning object that is protected by multi-factor authentication can be done by sending a command with authToken with "validate" as the action type. When this is received, the signature set in authToken can be validated using the public key, the TTL can be validated as having not yet expired and the authToken credential identifier can be validated as matching one of the credential identifiers bound to the provisioning object. After these three successful validations, the command can be authorized and the provisioning object can be updated.

A credential identifier that has already been bound to a provisioning object can also be removed from the provisioning object by sending an UPDATE command including authToken with "validate" and "unbind" action types along with a list of credential identifiers to be unbound. When this command is received, the signature, TTL in authToken are validated and the list of credential identifiers in authToken are validated to ensure that they match identifiers in the credential set for that domain. After all of these successful validations, the credential identifiers sent in the "unbind" action type are removed (i.e., unbound) from that provisioning object.

The token generator may or may not be the same entity as the authentication provider. The authentication provider validates that a given credential ID and credential match. The token generator creates a verifiable statement to the effect that the authentication has taken place. For example, the token generator may be the registry, while the authentication provider may be a trusted third party that validates credentials as a service to the registry. In other embodiments, the registry may authenticate the credentials and generate the tokens. In yet other embodiments, the token generator may be a trusted third party service of the registrar and a trusted third party of the registry. The token can be passed by the registrar to the registry, which can validate the token by using the public key of the token generator.

In accordance with embodiments of the present invention, Shared Registration commands include extensions for attaching to registry commands authentication tokens, bind, unbind and validation requests. An authentication token can include data and metadata, such as the credential identifier; an identifier for the authentication provider; a digital signature generated by the token provider; a TTL for the token; etc. In certain embodiments, the Shared Registration System can be a token provider that supports an XML schema that prescribes token formats. The expiration of the token can be set according to a policy enforced by the registry or other suitable entity. For example, the expiration can be less than or equal to the EPP session timeout. This may require more than one credential authentication during a single EPP session. An appropriate message can be sent upon the expiration of a token. The message can be used to prompt the registrant to provide a new credential.

A Shared Registration command in accordance with embodiments of the present invention can include a CREATE command for requesting that a token be generated and that can contain the following elements:

svcProvider: the credential authentication service provider
credentials: a list of credentials
credential: the credential As used herein a credential can be data that is generated or derived from something generated which can be validated. An examples credentials include an OTP, biometric data, etc. A credential identifier is data that is associated with a credential and that can be used to identify the credential. There need not be a 1-to-1 relationship between the credential identifiers and the authentication service providers. For example, OTP hardware tokens can be supported by more than one authentication service provider.

svcProvider may be omitted if the registry supports a default service provider. If an authentication provider other than the default is needed then the client needs to specify the svcProvider as the unique name or identifier of the provider.

A response to the CREATE command can include the generated token with the following elements:

token
svcProvider: the credential authentication service provider
credentialID: the matching credential identifier for the domain
createdDate: the token creation date
expirationDate: the token expiration date
signature: a digital signature of the token created by the token provider The following elements can be supported:

validate: requests that the specified authentication token be validated to authorize a transform operation. The token must have a credential identifier that matches one of the credential identifiers already bound to the provisioning object, such as a domain or host.

Bind: requests that the server create and persist a credential-to-provisioning-object mapping (a many-to-many mapping). The first bind does not necessarily require the inclusion of a validate action since the provisioning object is not protected by a multi-factor credential identifier.

Unbind: requests that the server remove a credential-to-provisioning-object mapping.

Info: request that the server return provisioning-object-to-credentials mappings.

Replay attacks in accordance with embodiments of the present invention may be prevented by salting the token with a nonce each time it is sent.

Adding another credential identifier to a provisioning object that is already protected by multi-factor authentication (i.e., already is bound to one or more credential identifiers) can be accomplished by sending another CREATE-AUTH-TOKEN command in addition to others sent previously or at the same time. Each CREATE-AUTH-TOKEN command can be used for each credential identifier to be bound to the domain. The registrar can then send an UPDATE domain command including authToken with the "validate" action type for the credential identifier that is already bound to the domain and the "bind" action type for the new credential identifier. When this command is received, the registry can validate both the digital signatures and TTLs for both authToken objects. In some embodiments, the bind command needs not require authTokens for the credentials that are to be bound to the registry object. The authToken may be used for validation only, and the "bind" portion could contain the credential identifiers that the user wishes to attach to the object. Because the user passes in a valid authToken for the "validate," the registry could considers this to be proof enough that the user is providing the correct credential identifiers. r The same can be said for unbind. Also, the generation of the authToken may be required to bind a credential identifier to a domain. An authToken for an already-bound credential identifier can further be validated by comparing the credential identifier in that authToken object with the set of credential identifiers already bound to the domain. After the successful validations, the new credential identifier can be bound to the domain.

In accordance with embodiments of the present invention, the registrant or other provisioning client can directly interface with a multi-factor authentication service to add multi-factor authentication credentials to its login pages. The multi-factor authentication service can create a signed token in a similar fashion to the registry, but with its own, distinct private key and its own format and set of attributes. This can permit the client to provide a single multi-factor credential (such as an OTP, token, biometric data, cryptographic challenge, etc.) at login that the provisioning client (e.g., a registrar) can use for authorizing provisioning object commands across one or more registries. The registries can accept the multi-factor authentication service generated tokens in the extension of transform operations of provisioning objects like a Domain Update Command. In the extension, the token type along with the token would be accepted, and the registry could verify the signature using the public key of the associated multi-factor authentication service. The registry could adapt the attributes of the multi-factor authentication service token (by filtering and/or mapping) for use in comparing them to the multi-factor authentication attributes bound to the provisioning objects such as the credential identifiers. For example, the multi-factor authentication token can contain an expiration date and time. It may contain a created date and time that could be used to apply a registry expiry policy.

An embodiment in accordance with the present invention will now be illustrated with regard to domain name registrations. This description is merely an example and is not meant to limit the scope of the present invention, which can be used in connection with any provisioning object. For example, embodiments of the present invention can be used in connection with hosts (e.g., as defined in RFC 5732) and contacts as defined in RFC 5733. EPP can be extended by adding new objects (e.g., Host, Contact, Email Forwarding, Defensive Registration) as defined by EPP Mapping specifications and by adding new attributes with EPP Extension specifications to one or more mappings. For example, a two factor authentication extension could be added that could be used with a wide range of mappings. EPP is a general provisioning protocol for any kind of object, so the present invention may be used with virtually any provisioning object. Creating a token can be defined within an EPP mapping, since it involves creating new kinds of objects for the CREATE command. Applying the token to a provisioning object can be handled with an EPP Extension specification by adding a new set of attributes to existing objects. Further, the present invention is not limited to EPP, but can be used with any suitable provisioning protocol, which can include any mechanism by which a customer of the registry communicates with the registry. For example, the interface could be a RESTful interface, a web services (SOAP) interface, or a non-standard interface. The use of EPP is just an example, but embodiments of the present the invention can be used with any interface and/or protocol.

In accordance with embodiments of the present invention, the registrant of a domain name can logon to the registrar web site, e.g., by using a logon identifier and a password, i.e., a secret shared between the registrant and the registrar. As part of the logon procedure, the registrant can obtain a multi-factor authentication credential from a multi-factor authentication service. The credential can be used to logon to one or more registrar sites. The credential can be any kind of data suitable for a credential, such as a OTP; a token containing a digital signature and a token identifier, as well as other attributes such as a created date, a TTL, etc.; biometric-based data; etc.

Upon successfully verifying the registrant's logon credentials, the registrar can receive and accept one or more requests from the registrant to change some or all of the registrant's domain name records. For example, the registrant may submit a request to change the name servers associated with a domain name that the registrant has already registered, request that a new domain name be registered, request that a domain name registration be deleted, request that the status across several domain names be changed, etc. To implement these requests, the registrar need not provide a new registrant's credential with each command. Rather, the registrar can provide to the registry the authToken generated on behalf of the registrant and stored at the registrar for the session. This is less burdensome for the registrant and more efficient for the registrar and registry.

The registrar can then formulate the appropriate commands (e.g., using EPP) to send to the registry to cause the requested changes to be made to the registry's domain name registration record. Along with the EPP commands, the registrar can send the OTP received from the registrant and an identifier associated with the registrant's OTP generator.

Upon receiving this communication from the registrar, the registry can send the OTP and identifier to a validation server. The validation server can be operated by the registry, or by a trusted third party authentication service provider. The validation server can send the result of its verification to the registry. If the OTP was successfully verified, then the registry can be assured the request originated from the registrant of the domain name and/or that the registry is properly authorized to effectuate the requested changes. A message reporting the success or failure of the processing of the change request message can be sent by the registry to the registrar. If the OTP is not successfully verified, then the registry can generate an error message and send it to the registrar, and not effectuate the requested changes. In accordance with embodiments of the present invention, a registrar can be in direct communication with a third party authentication provider that is capable of validating (herein also referred to as "verifying") a registrant's credentials and generating an authentication token. The registry can verify the authTokens signed by the third party authentication service provider by using the public key of that provider. Likewise, the registrar can use the same system.

The following is an example of an authentication session (token) command:

```
<?xml version="1.0" encoding="UTF-8"?>
<epp xmlns="urn:ietf:params:xml:ns:epp-1.0"
   xmlns:xsi="http://www.w3.org/2001/XMLSchema-instance"
xsi:schemaLocation="urn:ietf:params:xml:ns:ezp-1.0 epp-1.0.xsd">
   <command>
      <create>
         <authSession:create
            xmlns:authSession="http://www.verisign.com/epp/authSession-1.0"
xsi:schemaLocation="http://www.verisign.com/epp/authSession-1.0 authSession-1.0.xsd">
            <authSession:serviceProvider>VIP</authSession:serviceProvider>
            <authSession:otp>otp1234567</authSession:otp>
            <authSession:credentialList>
               <authSession:credentialId>xyz1234</authSession:credentialId>
               <authSession:credentialId>pqr1234</authSession:credentialId>
            </authSession:credentialList>
         </authSession:create>
      </create>
      <clTRID>AUTHCLI-12345</clTRID>
   </command>
</epp>
```

The following is an example of an authentication session (token) create response that contains the token itself:

```
<?xml version="1.0" encoding="UTF-8"?>
<epp xmlns="urn:ietf:params:xml:ns:epp-1.0"
   xmlns:xsi="http://www.w3.org/2001/XMLSchema-instance"
xsi:schemaLocation="urn:ietf:params:xml:ns:epp-1.0 epp-1.0.xsd">
   <response>
      <result code="1000">
         <msg>Command completed successfully</msg>
      </result>
      <resData>
```

```
            <authSession:creData
                xmlns:authSession="http://www.verisign.com/epp/authSession-1.0"
xsi:schemaLocation="http://www.verisign.com/epp/authSession-1.0 authSession-1.0.xsd">
                <authSession:token>
                    <authSession:serviceProvider>VIP</authSession:serviceProvider>
                    <authSession:credentialId>xyz1234</authSession:credentialId>
                    <authSession:crDate>2010-12-28T02:25:38.0205Z</authSession:crDate>
                    <authSession:exDate>2010-12-28T02:25:38.0205Z</authSession:exDate>
                </authSession:token>
                <authSession:signature>
                UjBsR09EbGhjZ0dTQUxNQUFBUUNBRU1tQ1p0dU1GUXhEUzhi
                </authSession:signature>
            </authSession:creData>
        </resData>
        <trID>
            <clTRID>AUTHCLI-12345</clTRID>
            <svTRID>AUTHSESSION-12345</svTRID>
        </trID>
    </response>
</epp>
```

The following is an example of binding the credential identifier to the domain example.com, which will require passing the matching token for subsequent domain updates:

```
<?xml version="1.0" encoding="UTF-8"?>
<epp xmlns="urn:ietf:params:xml:ns:epp-1.0"
    xmlns:xsi="http://www.w3.org/2001/XMLSchema-instance"
xsi:schemalocation="urn:ietf:params:xml:ns:epp-1.0 epp-1.0.xsd">
    <command>
        <update>
            <domain:update
                xmlns:domain="urn:ietf:params:xml:ns:domain-1.0"
xsi:schemaLocation="urn:ietf:params:xml:ns:domain-1.0 domain-1.0.xsd">
                <domain:name>example.com</domain:name>
            </domain:update>
        </update>
        <extension>
            <authExt:authActions xsi:schemaLocation=
                "http://www.verisign.com/epp/authExt-1.0
authExt-1.0.xsd" xmlns:authExt="http://www.verisign.com/epp/authExt-1.0"
xmlns:authSession="http://www.verisign.com/epp/authSession-1.0"
xmlns:xsi="http://www.w3.org/2001/XMLSchema-instance">
                <authExt:bind>
                    <authExt:tokenDataList>
                        <authExt:tokenData>
                            <authExt:tokenProvider>VRSN</authExt:tokenProvider>
                            <authExt:token>
                                <authSession:serviceProvider>VIP</authSession:serviceProvider>
                                <authSession:credentialId>xyz1234</authSession:credentialId>
                                <authSession:crDate>2010-12-28T02:25:38.0205Z</authSession:crDate>
                                <authSession:exDate>2010-12-28T02:25:38.0205Z
                                </authSession:exDate>
                            </authExt:token>
                            <authExt:signature>
                            UjBsR09EbGhjZ0dTQUxNQUFBUUNBRU1tQ1p0dU1GUXhEUzhi
                            </authExt:signature>
                        </authExt:tokenData>
                    </authExt:tokenDataList>
                </authExt:bind>
            </authExt:authActions>
        </extension>
        <clTRID>ABC-12345-XYZ</clTRID>
    </command>
</epp>
```

The following is an example of passing the token to validate (authorize) the update of the domain example.com with adding the name server ns1.example.com to the domain:

```
<?xml version="1.0" encoding="UTF-8"?>
<epp xmlns="urn:ietf:params:xml:ns:epp-1.0"
```

```
    xmlns:xsi="http://www.w3.org/2001/XMLSchema-instance"
xsi:schemaLocation="urn:ietf:params:xml:ns:epp-1.0 epp-1.0.xsd">
  <command>
    <update>
      <domain:update
        xmlns:domain="urn:ietf:params:xml:ns:domain-1.0"
xsi:schemaLocation="urn:ietf:params:xml:ns:domain-1.0 domain-1.0.xsd">
        <domain:name>example.com</domain:name>
        <domain:add>
          <domain:ns>
            <domain:hostObj>ns1.example.com</domain:hostObj>
          </domain:ns>
        </domain:add>
      </domain:update>
    </update>
    <extension>
      <authExt:authActions xsi:schemaLocation="http://www.verisign.com/epp/authExt-1.0
authExt-1.0.xsd" xmlns:authExt="http://www.verisign.com/epp/authExt-1.0"
xmlns:authSession="http://www.verisign.com/epp/authSession-1.0"
xmlns:xsi="http://www.w3.org/2001/XMLSchema-instance">
        <authExt:validate>
          <authExt:tokenData>
            <authExt:tokenProvider>VRSN</authExt:tokenProvider>
            <authExt:token>
              <authSession:serviceProvider>VIP</authSession:serviceProvider>
              <authSession:credentialId>xyz1234</authSession:credentialId>
              <authSession:crDate>2010-12-28T02:25:38.0205Z</authSession:crDate>
              <authSession:exDate>2010-12-28T02:25:38.0205Z</authSession:exDate>
            </authExt:token>
            <authExt:signature>
            UjBsR09EbGhjZ0dTQUxNQUFBUUNBRU1tQ1p0dU1GUXhEUzhi
            </authExt:signature>
          </authExt:tokenData>
        </authExt:validate>
      </authExt:authActions>
    </extension>
    <clTRID>ABC-12345-XYZ</clTRID>
  </command>
</epp>
```

The following is an example of replacing the credential identifier bound to the domain example.com, by first using the existing bound credential id to authorize the update, followed by binding a new credential id and removing the existing credential id:

```
<?xml version="1.0" encoding="UTF-8"?>
<epp xmlns="urn:ietf:params:xml:ns:epp-1.0"
    xmlns:xsi="http://www.w3.org/2001/XMLSchema-instance"
xsi:schemaLocation="urn:ietf:params:xml:ns:epp-1.0 epp-1.0.xsd">
  <command>
    <update>
      <domain:update
        xmlns:domain="urn:ietf:params:xml:ns:domain-1.0"
xsi:schemaLocation="urn:ietf:params:xml:ns:domain-1.0 domain-1.0.xsd">
        <domain:name>example.com</domain:name>
      </domain:update>
    </update>
    <extension>
      <authExt:authActions xsi:schemaLocation=
        "http://www.verisign.com/epp/authExt-1.0
authExt-1.0.xsd" xmlns:authExt="http://www.verisign.com/epp/authExt-1.0"
xmlns:authSession="http://www.verisign.com/epp/authSession-1.0"
xmlns:xsi="http://www.w3.org/2001/XMLSchema-instance">
        <authExt:validate>
          <authExt:tokenData>
            <authExt:tokenProvider>VRSN</authExt:tokenProvider>
            <authExt:token>
              <authSession:serviceProvider>VIP</authSession:serviceProvider>
              <authSession:credentialId>xyz1234</authSession:credentialId>
              <authSession:crDate>2010-12-28T02:25:38.0205Z</authSession:crDate>
              <authSession:exDate>2010-12-28T02:25:38.0205Z</authSession:exDate>
            </authExt:token>
            <authExt:signature>
            UjBsR09EbGhjZ0dTQUxNQUFBUUNBRU1tQ1p0dU1GUXhEUzhi
```

```
            </authExt:signature>
          </authExt:tokenData>
        </authExt:validate>
        <authExt:bind>
          <authExt:tokenDataList>
            <authExt:tokenData>
              <authExt:tokenProvider>VRSN</authExt:tokenProvider>
              <authExt:token>
                <authSession:serviceProvider>VIP</authSession:serviceProvider>
                <authSession:credentialId>xyz456</authSession:credentialId>
                <authSession:crDate>2001-12-17T09:30:47Z</authSession:crDate>
                <authSession:exDate>2001-12-17T09:30:47Z</authSession:exDate>
              </authExt:token>
              <authExt:signature>
              UjBsR09EbGhjZ0dTQUxNQUFBUUNBRU1tQ1p0dU1GUXhEUzhi
              </authExt:signature>
            </authExt:tokenData>
          </authExt:tokenDataList>
        </authExt:bind>
        <authExt:unbind>
          <authSession:credentialId>xyz1234</authSession:credentialId>
        </authExt:unbind>
      </authExt:authActions>
    </extension>
    <clTRID>ABC-12345-XYZ</clTRID>
  </command>
</epp>
```

Some embodiments of the present invention can utilize tokens generated by a trusted third party, rather than the registrar. For example, the registrar may directly interface with a multi-factor authentication service. In such cases, the <authSession:serverProvider> element could be a different value (e.g., "VeriSign Identity Protection," also known as "IP") and the <authExt:token> element could be replaced with the <authExt:genericToken> element, which can contain custom data. For example the following will bind an initial credential identifier with the domain example.com using a VIP token instead of a VeriSign (VRSN) token:

```
<?xml version="1.0" encoding="UTF-8"?>
<epp xmlns="urn:ietf:params:xml:ns:epp-1.0"
  xmlns:xsi="http://www.w3.org/2001/XMLSchema-instance"
xsi:schemaLocation="urn:ietf:params:xml:ns:epp-1.0 epp-1.0.xsd">
  <command>
    <update>
      <domain:update
          xmlns:domain="urn:ietf:params:xml:ns:domain-1.0"
xsi:schemaLocation="urn:ietf:params:xml:ns:domain-1.0 domain-1.0.xsd">
        <domain:name>example.com</domain:name>
      </domain:update>
    </update>
    <extension>
      <authExt:authActions xsi:schemaLocation=
        "http://www.verisign.com/epp/authExt-1.0
authExt-1.0.xsd" xmlns:authExt="http://www.verisign.com/epp/authExt-1.0"
xmlns:authSession="http://www.verisign.com/epp/authSession-1.0"
xmlns:xsi="http://www.w3.org/2001/XMLSchema-instance">
        <authExt:bind>
          <authExt:tokenDataList>
            <authExt:tokenData>
              <authExt:tokenProvider>VIP</authExt:tokenProvider>
              <authExt:genericToken>
                <vipToken:token>
                  <vipToken:credentialId>xyz1234</vipToken:credentialId>
                  <vipToken:crDate>2010-12-28T02:25:38.0205Z
                  </vipToken:crDate>
                </vipToken:token>
                <vipToken:signature>
                UjBsR09EbGhjZ0dTQUxNQUFBUUNBRU1tQ1p0dU1GUXhEUzhi
                </vipToken:signature>
              </authExt:genericToken>
            </authExt:tokenData>
          </authExt:tokenDataList>
```

```
        </authExt:bind>
      </authExt:authActions>
    </extension>
    <clTRID>ABC-12345-XYZ</clTRID>
  </command>
</epp>
```

In some cases, it may be necessary for the registrar to update provisioning objects with extended security in accordance with an embodiment of the present invention. For example, when a domain is auto-renewed, but the registrar is unable to obtain payment from the registrant. In such cases, the registrar may want to delete the domain (to avoid an unreimbursed registry fee to the registrar) or remove it from the zone file until payment from the existing registrant or a new registrant can be obtained.

Embodiments of the present invention can accommodate such situations by including a registrar OTP in an EPP command. If the registrar OTP is provided with the EPP command, then the domain can be updated without having to validate the registrant OTP.

Embodiments of the present invention can operate with multiple vendors to validate multiple factors. The vendor should meet security requirements of SRS and provide an integration mechanism. The validation servers in an embodiment can include validation servers from the registry and from third parties.

A system in accordance with the present invention can include a registrant client in communication with registrar server, which in turn is in communication with a registry server. The registrant client has access to one or more registrant factor generators. In this embodiment, the registrant factor generator can generate registrant OTPs. The registrant factor generator can also include a biometric reader, such as a fingerprint reader or an iris scanner, or any other registry-acceptable second authentication factor. Any number of factor generators may be used by the registrant client. The registrar server is in communication with the registrar factor generators. The registrar factor generator can generate registrar OTPs and/or other credentials. Any number of factor generators may be used by the registrar. The registry is in communication with one or more validation servers. A validation server can be an OTP validation server that is coupled to an OTP validation server database. The validation server database can store records that correlate a given credential identifier with the shared secret stored in the credential that is used to generate the OTPs. The other validation servers can be used to verify other kinds of factors (e.g., biometrics, certificates, etc.) provided by registrants and/or registrars. A validation server may be operated by a trusted third party, such as VeriSign, or be operated by the registry itself.

The registrant can be a user interacting with a registrant computer that is in communication with the registrar through a network, such as a Local Area Network (LAN), a Wide Area Network (WAN), the Internet, etc. The factor generators can be a Unified Authentication credential that can support OAuth-compliant, time-based, LDAP, and ODBC for OTP generation, or any other suitable OTP generator. The biometric generators can include a retina scanner, iris scanner, fingerprint reader, voice recognition software or any other suitable biometric factor generator.

The registrar server can include a gateway, a registrar database and other components known in the art to comprise a registrar. The registry can include a gateway server, a registry application server and a registry database. The OTP validation server can be a Unified Authentication validation server, or any other validation server that can verify the OTPs submitted by the registrant and/or the registrar. Biometric validation server can be a server capable of verifying a biometric (e.g., retina scan, fingerprint, etc.) submitted by a registrant or registrar.

In accordance with embodiments of the present invention, one or more failed attempts to verify a factor can result in actions in addition to not processing the EPP command. For example, repeated failed verifications can be reported as a potential fraud to the registrar, or to a fraud detection and prevention service for further analysis. The velocity (e.g., number of failed attempts per unit time (e.g., n seconds, m minutes, etc.) with which the attempts are made can be reported for a given domain, type of domain, source of requests, registrar, registrant, type of registrant, etc. The reporting can be triggered when the number or frequency of the attempts meets or exceeds a given threshold. Likewise, frequent changes of a credential bound to a provisioning object can also be reported, particularly if the number of such changes exceeds a given threshold (e.g., more than five times in a week). A large number or high frequency of attacks may also indicate a denial of service attack, which can be reported and appropriate countermeasures taken. Any suitable action may be taken in response to detecting a security breach, such as locking the registrations for one or more domains; throttling the number of requests that will be processed from a given source, such as a registrar; throttling the number of requests that will be processed that originate from a given factor generator (e.g., credential, PKI smart card, biometric reader, etc.) or registrant.

Embodiments of the present invention can validate the factor asynchronously. For example, the registrant can send a request to a registrar to update a domain name record, along with at least one factor, such as an OTP, biometric data, PKI data from a smart card, etc. The registrar can send an update command and the factor to the registry. The registry can receive the command and return a success message to the registrar by setting the object (domain) with a pending status, such as pendingUpdate. The registry can then send at least one factor to one or more validation servers for verification. Based upon the results of the validation, the registry will or will not apply the update to the domain name record and remove the pending status. The registrar can then be notified of the result of the pending request, e.g., via a poll message.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. A method for authentication, the method comprising:
  receiving a token create command that includes
    a registrant credential identifier requested by a registrant
      for binding to a registry object, and a registrant credential, wherein the registrant credential identifier identifies the registrant as being associated with the registrant credential;

obtaining an authentication token that includes the registrant credential identifier and a digital signature that attests the registrant credential is valid;

sending the authentication token;

receiving the authentication token and a transform command associated with the registry object, wherein the transform command includes one or more actions associated with the registry object;

validating the digital signature of the authentication token;

determining, by a processor, that the registrant credential identifier included in the authentication token corresponds to a credential identifier associated with the registry object; and authorizing the transform command based upon validating the digital signature and determining that the registrant credential identifier included in the authentication token corresponds to the credential identifier.

2. The method of claim 1, wherein obtaining the authentication token comprises:

generating, by a registry, the authentication token.

3. The method of claim 1, wherein the authentication token is generated by a third party authentication service provider.

4. The method of claim 1, the method further comprising:

sending the registrant credential from the registry to an authentication service; and receiving, from the authentication service, a validation response that indicates that the registrant credential has been successfully verified.

5. The method of claim 4, wherein the registrant credential includes an attribute that specifies the authentication service, the method further comprising:

selecting the authentication service from a plurality of authentication services based upon the attribute of the authentication token.

6. The method of claim 1, wherein the authentication token includes an expiration date.

7. The method of claim 6, the method further comprising:

validating that the expiration date of the authentication token has not passed.

8. The method of claim 7, the method further comprising:

authorizing the transform command based upon validating the expiration date of the authentication token.

9. A method for authentication, the method comprising:

receiving a transform command, associated with a registry object, and an authentication token, wherein the transform command includes one or more actions, associated with the registry object; and wherein an authentication token that includes the registrant credential identifier associated with a registrant credential requested by a registrant for binding to a registry object, and a digital signature that attests the registrant credential is valid;

validating the digital signature of the authentication token;

determining, by a processor, that the registrant credential identifier corresponds to a credential identifier associated with the registry object; and authorizing the transform command based upon validating the digital signature and determining that registrant credential identifier corresponds to the registrant credential identifier associated with the registry object.

10. The method of claim 9, wherein the authentication token is generated by a third party authentication service using an authentication service private key and validating the digital signature of the authentication token is based upon an authentication service public key that corresponds to the private key.

11. The method of claim 9, wherein the authentication token includes a validation service attribute.

12. The method of claim 9, wherein the authentication token includes an expiration date.

13. The method of claim 11, the method further comprising:

validating that the expiration date of the authentication token has not passed.

14. A system for authentication, the system comprising:

a receiver device that receives a request to generate an authentication token with a registrant credential and a registrant credential identifier requested by a registrant for binding to a registry object, wherein the registrant credential identifier identifies a registrant as being associated with the registrant credential;

an authentication token generator that causes an authentication token to be created that includes the registrant credential identifier and a digital signature;

a transform command processor that receives a transform command and the authentication token wherein the transform command includes one or more actions, associated with a registry object;

a validation device that validates the digital signature of the authentication token and determines that the registrant credential identifier associated with the authentication token corresponds to a credential identifier associated with the registry object; and an authorization device that authorizes the transform command processor to process the transform command based upon validating the digital signature and determining that the registrant credential identifier corresponds to the credential identifier.

15. The system of claim 14, wherein the authentication token generator is a third party authentication service.

16. The system of claim 14, wherein the authentication token generator is a registry object registry.

17. A non-transitory, computer-readable storage medium including a plurality of instructions that, when executed by a processor, causes the processor to:

receive a request for an authentication token, the request including a registrant credential and a registrant credential identifier requested by a registrant for binding to a registry object, wherein the registrant credential identifier identities a registrant as being associated with the registrant credential;

cause the authentication token to be obtained, the authentication token including the registrant credential identifier and a digital signature that attests the registrant credential is valid;

receive the authentication token and a transform command associated with a registry object, wherein the transform command includes one or more actions, associated with the registry object;

validate the digital signature of the authentication token;

determine that the registrant credential identifier within the authentication token corresponds to a credential identifier associated with the registry object; and authorize the transform command based upon verifying the digital signature and determining that the registrant credential identifier corresponds to the credential identifier associated with the registry object.

* * * * *